(12) United States Patent
Utter et al.

(10) Patent No.: US 6,371,388 B2
(45) Date of Patent: Apr. 16, 2002

(54) FAN PROPELLED MISTER

(75) Inventors: Steven M. Utter; Geri Utter, both of Chandler, AZ (US)

(73) Assignee: Misty Mate, Inc., Gilbert, AZ (US)

( * ) Notice: Subject to any disclaimer, the term of this patent is extended or adjusted under 35 U.S.C. 154(b) by 0 days.

(21) Appl. No.: 09/809,605

(22) Filed: Mar. 14, 2001

Related U.S. Application Data

(63) Continuation of application No. 09/310,524, filed on May 12, 1999, now Pat. No. 6,216,961.

(51) Int. Cl.$^7$ ............................................. F23D 11/16
(52) U.S. Cl. .................. 239/419; 239/152; 239/331; 239/373; 239/423; 239/433; 239/407; 261/28; 62/304; 62/314
(58) Field of Search ..................... 239/128, 152–154, 239/302, 307, 346, 331, 333, 373, 407, 418, 419, 423, 424, 433, 589; 261/28, 89, 90, 116; 62/304, 314, 121, 259.3

(56) References Cited

U.S. PATENT DOCUMENTS

| | | | |
|---|---|---|---|
| 1,986,407 A | * | 1/1935 | Parker .................... 239/153 X |
| 2,528,927 A | * | 11/1950 | Vose ...................... 239/154 X |
| 3,812,656 A | | 5/1974 | Barnhart |
| 4,278,617 A | | 7/1981 | Rahman |
| 4,512,515 A | * | 4/1985 | Tenney .................. 239/373 X |
| 4,746,466 A | | 5/1988 | Takahashi |
| 4,884,314 A | | 12/1989 | Miner et al. |
| 4,976,319 A | | 12/1990 | Eberhardt et al. |
| 5,020,725 A | | 6/1991 | Waldrum |
| D319,122 S | | 8/1991 | Gierke et al. |
| D319,714 S | | 9/1991 | Gierke et al. |
| D320,294 S | | 9/1991 | Miner |
| 5,366,108 A | | 11/1994 | Darling |
| 5,370,278 A | | 12/1994 | Raynie |
| 5,478,015 A | * | 12/1995 | Black ...................... 239/154 |
| 5,514,303 A | | 5/1996 | Chiu et al. |
| 5,535,951 A | | 7/1996 | Utter |
| 5,564,124 A | | 10/1996 | Elsherif et al. |

(List continued on next page.)

FOREIGN PATENT DOCUMENTS

| | | |
|---|---|---|
| DE | 652808 | 11/1937 |
| DE | 195 43 003 A1 | 5/1997 |

OTHER PUBLICATIONS

PCT/US00/09217 International Search Report, published Jul. 5, 2000.

*Primary Examiner*—Steven J. Ganey

(57) ABSTRACT

The fan propelled misting apparatus for cooling an extended area by evaporative cooling includes a blower with a hollow, cylindrical mist discharge tube, and a fan for propelling air flow through the mist discharge tube; and a misting device connected to the blower for delivering a fine spray of water to the cylindrical mist discharge tube. The misting device includes a pressurizable fluid tank, such as a piston type pump, with a water supply tube connected between the pressurizable fluid tank and the mist discharge tube for delivering the fine spray of water to the cylindrical mist discharge tube. The water supply tube has a nozzle at a distal end of the water supply tube disposed in the mist discharge tube so as to deliver the fine spray of water in the air flow provided by the blower. A valve is provided for controlling flow of water through the water supply tube. The fan propelled misting apparatus may alternatively include a waist pack adapted to be secured to a user's waist, with a fan disposed in the waist pack, and a misting device in the waist pack for delivering a fine spray of water near the fan. The fan is battery powered, and the fan housing is bell shaped to provide higher air flows.

4 Claims, 3 Drawing Sheets

U.S. PATENT DOCUMENTS

| | | |
|---|---|---|
| 5,571,260 A | 11/1996 | Krug |
| 5,607,087 A | 3/1997 | Wery et al. |
| 5,613,371 A | 3/1997 | Nelson |
| 5,620,140 A | 4/1997 | Utter |
| 5,620,633 A | 4/1997 | Junkel et al. |
| 5,622,056 A | 4/1997 | Utter |
| 5,645,404 A | 7/1997 | Zelenak |
| 5,667,731 A | 9/1997 | Junkel et al. |
| 5,671,884 A | 9/1997 | Restive |
| D386,572 S | 11/1997 | Radtke et al. |
| D387,422 S | 12/1997 | Radtke et al. |
| D387,852 S | 12/1997 | Radtke et al. |
| 5,699,933 A | 12/1997 | Ho et al. |
| 5,722,573 A | 3/1998 | Carnel |
| 5,735,440 A | 4/1998 | Regalbuto |
| 5,740,948 A | 4/1998 | Chu et al. |
| 5,755,361 A | 5/1998 | Restive et al. |
| 5,755,368 A | 5/1998 | Bekkedahl |
| D395,701 S | 6/1998 | Radtke et al. |
| 5,762,661 A * | 6/1998 | Kleinberger et al. .... 261/116 X |
| 5,775,590 A | 7/1998 | Utter |
| 5,775,591 A | 7/1998 | Fauci |
| D397,427 S | 8/1998 | Junkel et al. |
| 5,788,134 A | 8/1998 | Matic, Jr. |
| 5,947,384 A * | 9/1999 | McCauley .................. 239/152 |

* cited by examiner

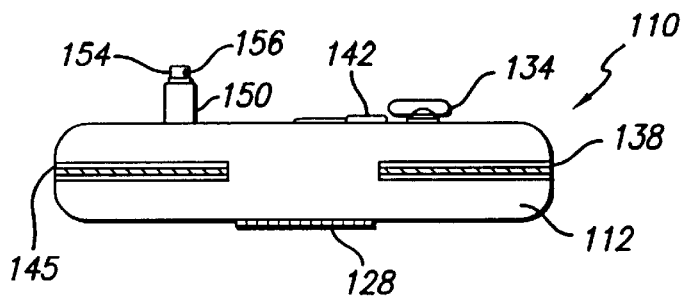
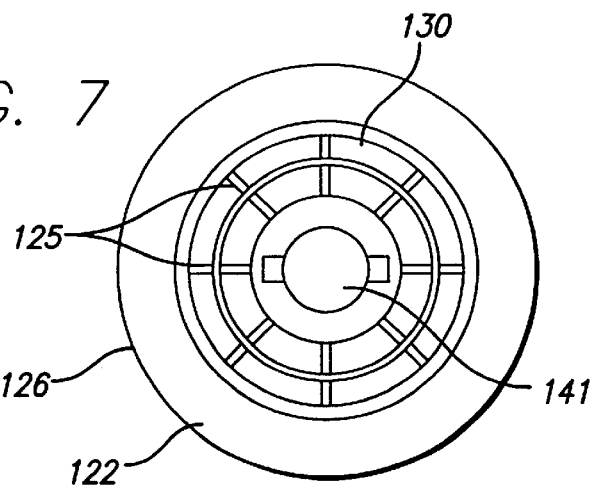
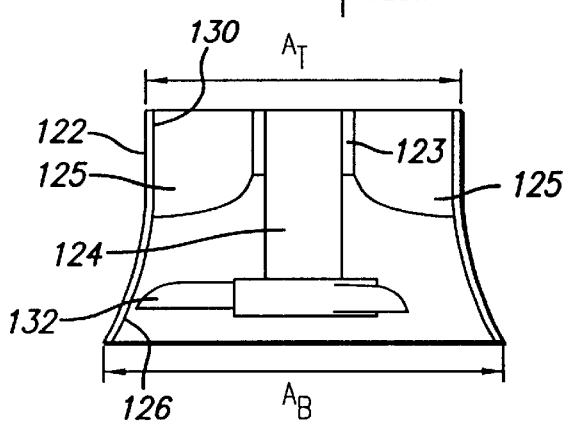
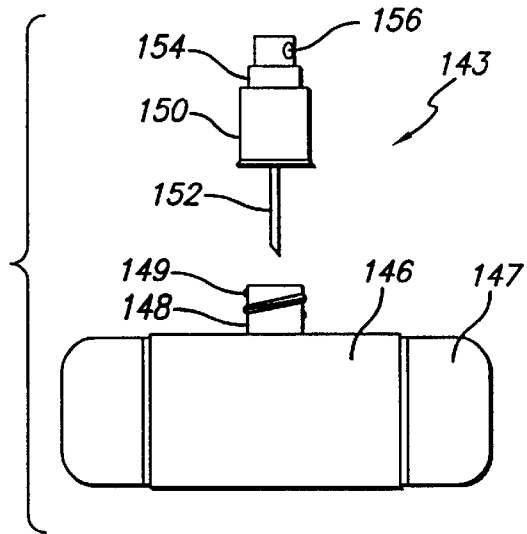

FAN PROPELLED MISTER

RELATED APPLICATIONS

This is a continuation of Ser. No. 09/310,524 filed May 12, 1999, now U.S. Pat. No. 6,216,961.

BACKGROUND OF THE INVENTION

1. Field of the Invention

This invention relates generally to devices for delivering a fine mist spray to cool an area by evaporative cooling, and more particularly concerns a fan propelled misting apparatus for providing a high velocity flow of air and a finely divided mist for evaporative cooling of wide areas.

2. Description of Related Art

While heated vaporizers provide humidifying vapors, atomizer type humidifiers typically generate a cooling mist. Such devices for providing a cooling mist are useful for efficiently and economically cooling large areas such as sections of outdoor amusement parks, and smaller areas such as a garden area, or even a single person. A portable misting device utilizing a pressurizable fluid tank and an atomizing nozzle for providing a finely divided water vapor mist is disclosed in U.S. Pat. No. 5,775,590, which is incorporated by reference herein.

Another type of conventional portable spray device provides a water spray, body massager, and a fan. Various types of cool mist humidifiers are also known that have a fan for distributing a mist. One high capacity device has a water driven fan that provides a water misted source of cool air for fighting fires. Another typical type of portable misting device includes a hand held spray applicator such as a spray bottle, and a low speed fan, so that the device typically needs to be placed within a distance of four inches or less from the user, in order to achieve any significant cooling effect for the user.

It would be desirable to provide a cooling device that not only provides an evaporative cooling effect from the evaporation of a water mist, but also takes advantage of the wind chill effect that occurs when wind blows across a person's bare skin, and thereby removes heat. The wind chill effect is typically quantified as a wind chill equivalent air temperature that at a standard wind speed would produce the same heat loss as the given temperature and wind speed, as a measure of the cooling power of a given wind speed on a person's bare skin, at a given temperature. For example, a 35° F. temperature wind speed of 5 MPH results in a wind chill equivalent air temperature of 33° F.; a 35° F. temperature wind speed of 10 MPH results in a wind chill equivalent air temperature of 22° F.; and a 35° F. temperature wind speed of 15 MPH results in a wind chill equivalent air temperature of 16° F.

In order to increase the evaporative cooling effect of a water vapor mist, and to increase the wind chill effect, it would thus be desirable to provide a high speed air flow such as can be provided by a high speed fan. Small portable hand-held fans operating at about 6,000 RPM are known that can achieve a significant wind velocity at a close range such as about four inches or less, but such fans typically include blades that are low pitched and soft, and do not displace a sufficient amount of air to achieve a significant wind velocity at greater distances. In addition, the fanned air from such hand held fans readily disperses at a more convenient distance of about 18 inches from the fan, so that for delivery of such a cooling mist over distances of about 18 inches or greater, it would also be desirable to provide a generally laminar air flow for carrying and evaporating the mist, to allow such a laminar flow of air to resist dispersal while still efficiently mixing with a water vapor mist, achieving an effective wind chill factor to provide a more effective evaporative cooling from the water vapor mist before it is dispersed, and to reduce the power requirements and high velocities necessary to achieve a prolonged period of air flow about the water vapor mist. The present invention meets these needs.

SUMMARY OF THE INVENTION

Briefly, and in general terms, in one currently preferred embodiment, the present invention provides for an improved water vapor misting apparatus for generating a cooling water vapor mist, and generating a contained laminar, high speed air flow carrying the water vapor mist to increase the evaporative cooling effect of the water vapor mist, allowing the cool water vapor mist to be directed more effectively over greater distances. A water atomizer dispenses a water vapormist within a hollow discharge tube which provides a guidant path for air directed from a fan or impeller. The fan propelled misting apparatus can advantageously propel the finely divided mist toward the user, or a crowd, for example, and can be used to propel the mist for a number of feet by hand directing the discharge tube.

Thus in the first embodiment, the invention accordingly provides for a fan propelled misting apparatus for cooling an extended area by evaporative cooling, comprising a misting device and a blower. The blower advantageously includes a hollow, cylindrical mist discharge tube, and a high speed fan for propelling air flow through the mist discharge tube. The misting device is connected to the blower for delivering a fine spray of fluid to a distal portion of the cylindrical mist discharge tube, where the mist effectively mixes with a laminar air flow provided by the fan to increase the evaporative cooling effect of the water vapor mist.

In a presently preferred aspect of the first embodiment of the invention, the misting device comprises a pressurizable fluid tank with a water supply tube connected between the pressurizable fluid tank and the mist discharge tube for delivering the fine spray of water to the cylindrical mist discharge tube. The water supply tube preferably has a nozzle at a distal end of the water supply tube disposed in the mist discharge tube so as to deliver the fine spray of water in the air flow provided by the blower. The misting device also preferably further comprises a valve for controlling flow of water through the water supply tube. In one presently preferred embodiment, the pressurizable fluid tank comprises a piston type pump having a handle, and a removable cap allowing for filling of the pump with water. In another presently preferred aspect, the blower comprises a propeller, a motor driving the propeller, and a switch controlling operation of the motor. In the first preferred embodiment, the pressurizable fluid tank is disposed externally; and in a second preferred embodiment, the pressurizable fluid tank is disposed internally, such as in the handle;

In a third presently preferred embodiment, the fan propelled misting apparatus comprises a waist pack adapted to be secured to a user's waist, with a fan disposed in the waist pack. The fan has a housing with an intake opening, and an exhaust opening directed toward the user's face when the waist pack is secured to the user's waist. A misting device is also provided in the waist pack for delivering a fine spray of water adjacent to the fan exhaust opening. In one presently preferred aspect, the misting device comprises a spray bottle having a water tank and a cap, with an intake tube and a spray pump having a nozzle directable adjacent to said exhaust opening of said fan. In other presently preferred aspects, the waist pack typically includes a waist strap for securing the waist pack to the user's waist, and the waist pack includes a battery power supply for the fan. In another presently preferred aspect, the fan housing is bell shaped, with the cross-sectional area of the intake opening being larger than the cross-sectional area of the exhaust opening, and the fan preferably employs a high speed motor having a rotational speed of up to 10,200 RPM, that is capable of providing an air velocity of about 17 mph approximately 18 inches from the exhaust opening of the fan.

These and other aspects and advantages of the invention will become apparent from the following detailed description and the accompanying drawings, which illustrate by way of example the features of the invention.

BRIEF DESCRIPTION OF THE DRAWINGS

FIG. 6 is a front view of the apparatus of FIG. 4;

FIG. 7 is a top view of the fan housing of the apparatus of FIG. 4;

FIG. 8 is a cross-sectional view of the fan of the apparatus of FIG. 4; and

FIG. 9 is an exploded view of the spray device of the apparatus of FIG. 4.

DETAILED DESCRIPTION OF THE PREFERRED EMBODIMENTS

Figure 1:
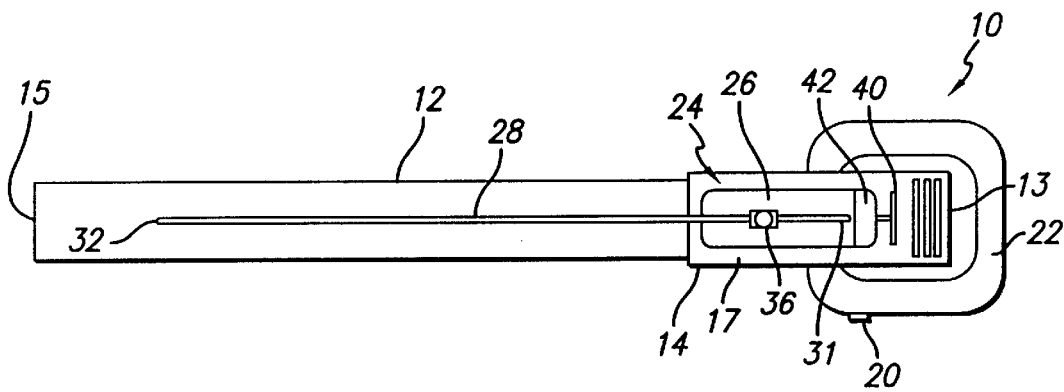
FIG. 1 is a side elevational view of a first preferred embodiment of a fan propelled misting apparatus according to the invention.
Figure 2:
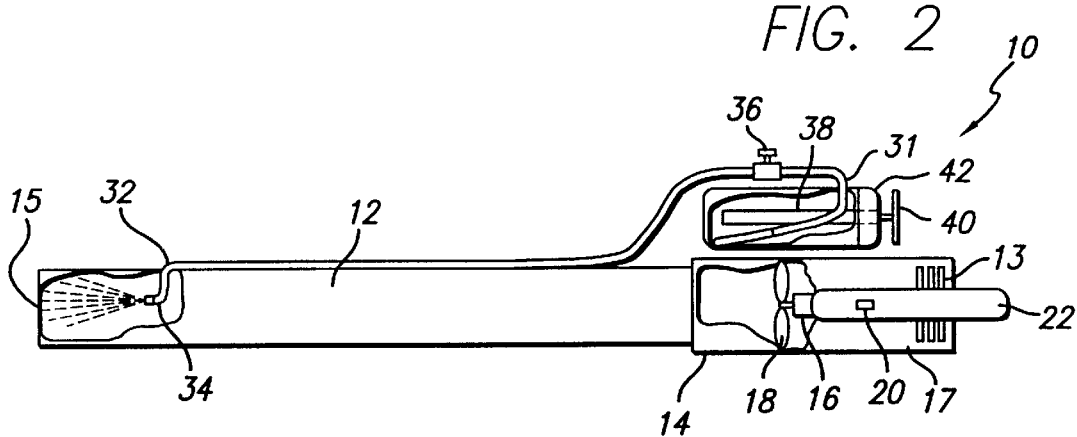
FIG. 2 is a cutaway top view of the apparatus of FIG. 1.

Water vapor misting cooling devices typically provide a spray of water or a water vapor mist, and a short lived turbulent air flow provided by a fan, resulting in inefficient evaporative cooling as the spray or mist is rapidly dispersed. As is illustrated in FIGS. 1 and 2, in a first preferred embodiment, the invention provides for a fan propelled mister 10, having a hollow, cylindrical discharge tube 12 for providing a laminar, high velocity air flow. The mister has intake vents 13 for air to be drawn into a blower or impeller 14, having a distal or outlet end 15 for discharge of evaporatively cooled air. The blower includes a fan motor 16 mounted in a housing 17 for driving a propeller 18, and typically includes a switch 20 mounted conveniently on a handle 22. A currently preferred range of fan speed is from about 8,000 RPM to about 12,000 RPM, which is sufficient to provide a high velocity, laminar air flow through the discharge tube. Fan speeds of about 9,000 RPM, have been achieved with a 12 volt DC electric motor, for example, and fan speeds of about 8,000 RPM have been achieved by powering the electric motor with four "D" cell batteries. The fan motor is preferably a DC electric motor, and the source of power (not shown) for the motor is currently preferably one or more batteries, so that the fan propelled mister can be cordless, and portable. However, the fan propelled mister could also utilize line current for a power supply, in situations where greater power is desired, or could be powered by an internal combustion engine.

In a presently preferred aspect, the fan propelled mister includes a misting device 24 for providing a finely divided, atomized water vapor mist to be carried by the high velocity air flow from the fan. In one presently preferred embodiment, the misting device includes a pressurizable fluid tank 26 with a water supply tube 28 having a proximal end 30 connected to the fluid tank through a sealed port 31, and connected through a port 32 adjacent to the distal or outlet end of the discharge tube. The water supply tube preferably has an atomizing nozzle 34 at the distal end of the water supply tube for providing a finely divided water spray. A valve 36 connected to the water supply tube is also preferably provided for controlling the flow of water through the water supply tube to the discharge tube. In a currently preferred aspect, the fan propelled mister is intended to be portable, and the misting device fluid tank includes a piston type pump 38 having a reciprocating handle 40 and a removable, sealable cap 42 for filling the fluid tank with water. The fan propelled misting apparatus provides a laminar, high velocity air flow for carrying and mixing the finely divided water vapor mist, combining the effectiveness of a fine spray mist cooling device with a high speed blower, that allows a fine, cooling spray to be sprayed over a crowd.

Figure 3:
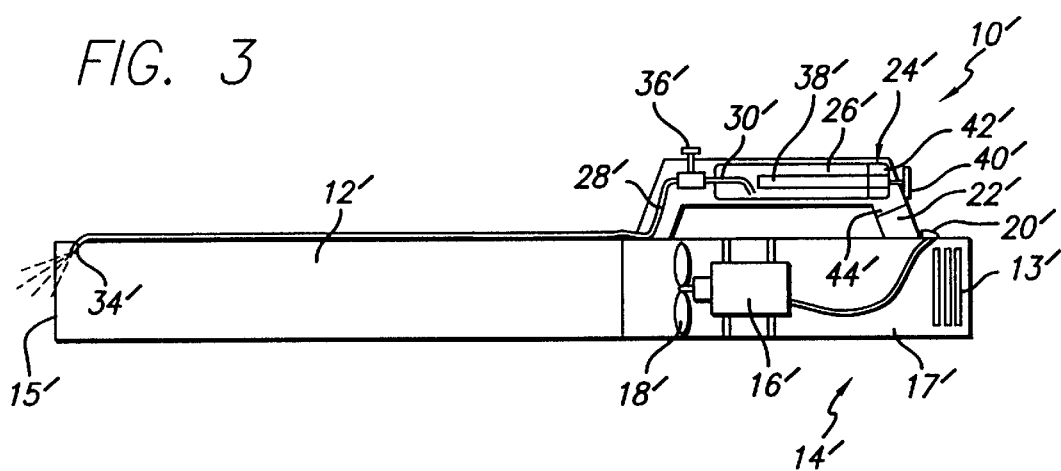
FIG. 3 is a schematic diagram of a second preferred embodiment of a fan propelled misting apparatus according to the invention.

Referring to FIG. 3, in an alternate preferred embodiment, the invention provides for a fan propelled mister 10', having a hollow, cylindrical discharge tube 12' providing a laminar, high velocity air flow, with intake vents 13' in the blower or impeller 14', and a distal or outlet end 15' for discharge of evaporatively cooled air. As in the previous embodiment, the blower includes a high speed fan motor 16' mounted in the housing 17' of the blower for driving a propeller 18', with a switch 20' mounted on the handle 22'. The fan motor is preferably a DC electric motor, and the source of power (not shown) for the motor is currently preferably by one or more batteries, so that the fan propelled mister can be cordless, and portable, although the fan propelled mister could also utilize line current for a power supply, or could be powered by an internal combustion engine, for example. A misting device 24' is also provided within the housing of the blower, such as in the handle of the blower as shown in FIG. 3, for providing a finely divided, atomized water vapor mist to the discharge tube. In a preferred aspect, the misting device can, for example, include a pressurizable fluid tank 26' with a water supply tube 28' proximal end 30' connected to the fluid tank through a sealed port 31' adjacent to the distal end of the discharge tube, and extending in the blower to dispense a finely divided water vapor mist to the discharge tube downstream of the fan propeller at the outlet end of the discharge tube. The water supply tube preferably has an atomizing nozzle 34' at the distal end of the water supply tube for providing the finely divided water spray. A valve 36' connected to the water supply tube is also preferably provided for controlling the dispensing of water vapor mist through the water supply tube to the discharge tube. The misting device fluid tank preferably includes a piston type pump 38' having a reciprocating handle 40' and a removable, sealable cap 42' for filling the fluid tank with water, with the pump and cap of the pump being accessible through a hatch 44' of the handle.

Figure 4:
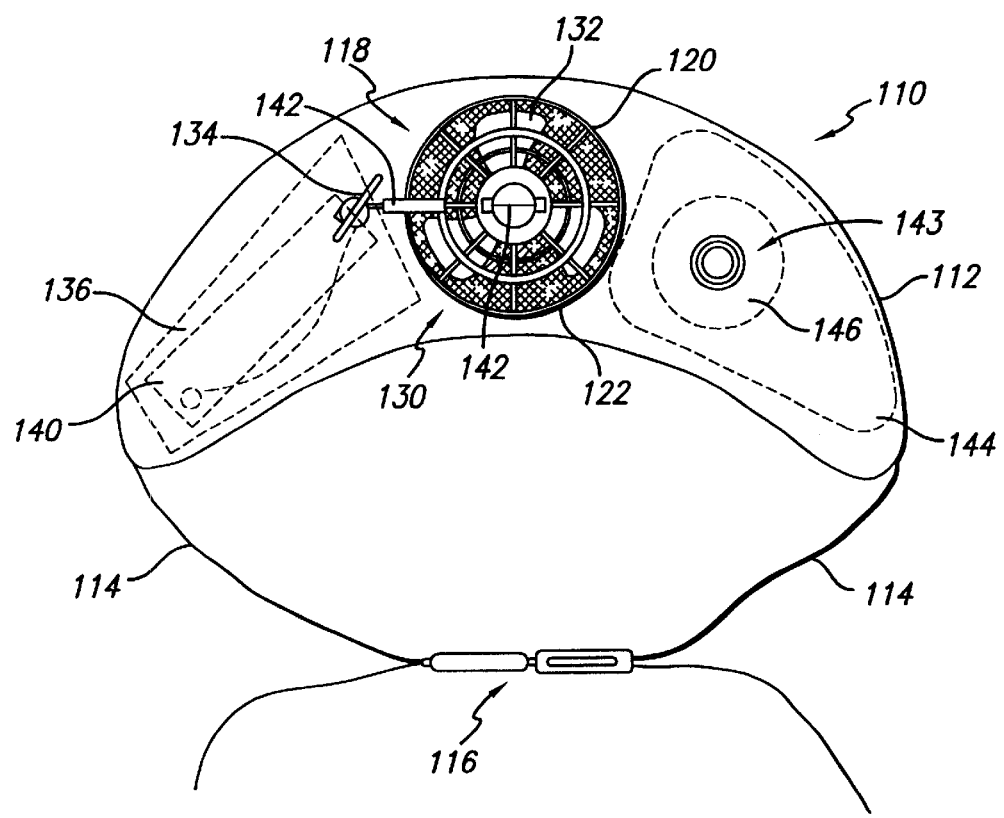
FIG. 4 is a top plan view of a third preferred embodiment of a fan propelled misting apparatus according to the invention.
Figure 5:
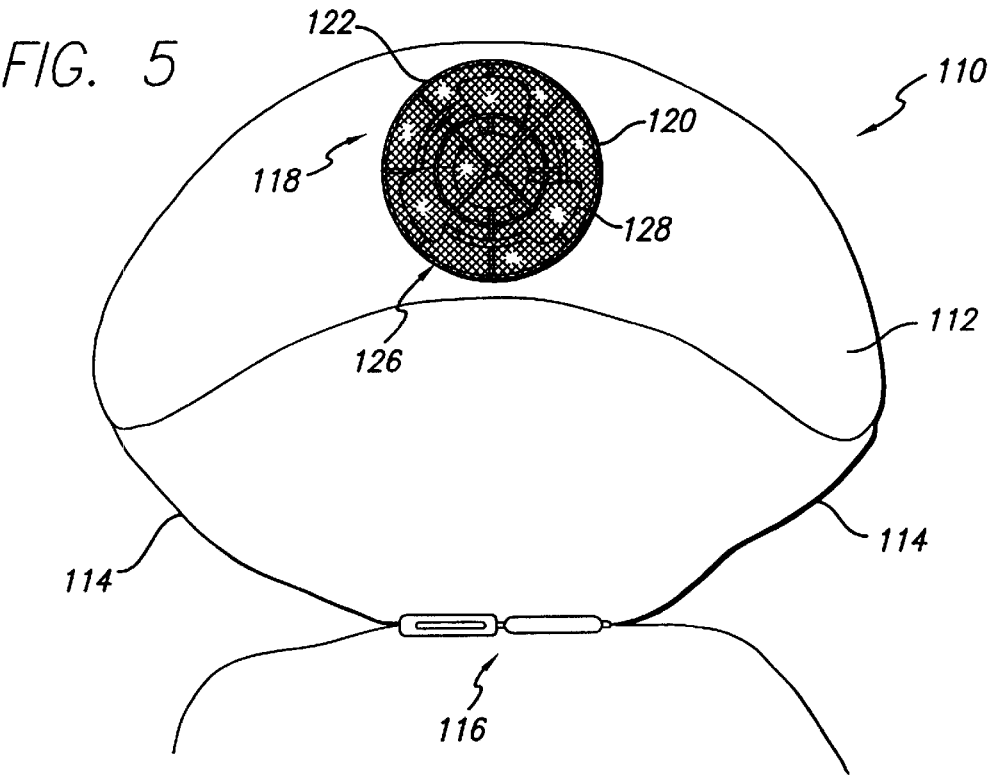
FIG. 5 is a bottom plan view of the apparatus of FIG. 4.

In another alternate preferred embodiment illustrated in FIGS. 4–9, the invention provides for a waist pack fan propelled mister 110 shown in FIGS. 4 and 5, including a waist pack 112 for securing the mister to the user. The waist pack can be made of a fabric such as nylon, cotton, and the like, and preferably includes waist belts or straps 114 connectable about the waist of the user by a quick release buckle or clip 116, to orient the fan propelled mister to direct the fan toward the face of the user. Alternatively, the pack can have shorter straps such as may be suitable for attaching the pack to the user's arm, for example, allowing the user to change the direction of the mister as desired.

Referring to FIGS. 4–8, the waist pack fan propelled mister also preferably includes a fan or impeller 118 disposed in a tubular opening 120 in waist pack, to be directed toward the face of the user when the waist pack is secured around the waist of the user. The fan includes a housing 122 seen best in FIGS. 7 and 8, and a fan motor 124 mounted in a tubular mounting 123 connected to the housing by streamlined struts 125. In a currently preferred embodiment, as is illustrated in FIG. 8, the fan housing is generally bell shaped, having an intake opening 126 that is typically covered by a wire mesh screen 128 to protect against foreign objects being drawn into or otherwise entering the fan during operation. The intake opening preferably has a bottom cross-sectional area $A_B$ that is larger than the top cross-sectional area $A_T$ of the exhaust opening 130. A propeller 132, typically having three blades, is mounted to the fan motor, and is oriented to propel air through the fan housing from the wider bottom opening to the narrower top opening. It has been found the bell shaped housing increases the air velocity that can be provided by the fan, at a distance of about 18 inches from the exhaust opening of the fan, by as much as 33%. It is believed that the bell shaped housing is thus advantageous in providing a substantially laminar air flow for carrying and evaporating the mist, to allow such a laminar flow of air to resist dispersal while still efficiently mixing with a water vapor mist. It is believed that the focused, laminar high velocity air flow that is achievable provides an effective wind chill factor allowing a more effective evaporative cooling by evaporation of the water vapor mist before it is dispersed, and reducing the power requirements otherwise needed for high velocities necessary to achieve a prolonged period of air flow about the water vapor mist.

Referring again to FIGS. 4 and 5, a switch 134 for controlling the fan motor is attached to the waist pack, and typically has "off," "low," "medium," and "high" speed positions. A battery pocket 136 is provided in the waist pack, with an opening accessed by zipper 138, for holding a battery 140, connected to the fan motor by electrical connectors 142. The motor and the electrical connectors can be protected by a cap 141 on the top of the fan housing. The battery is currently preferably a sealed, maintenance free, 6 volt, rechargeable battery. The fan motor is currently preferably a high performance, high speed, 6 volt DC electric motor with a high torque rating, such as those available under the trade name Mabuchi Motor RC-260 RA/SA or RC-280RA/SA from Aristo-Craft/LMP, Inc. of Watchung, N.J. In conjunction with the switch, the fan motor typically has a "low speed" setting of about 4,000 RPM, a "medium speed" setting of about 7,300 RPM, and a "high speed" setting of about 10,200 RPM, providing a wind velocity of about 17 mph at approximately 18 inches from the outlet of the fan housing.

When directed toward the user, it has been found that a high velocity wind speed causes the greatest "wind chill effect," causing evaporation of water for an even greater cooling effect from the fan propelled misting apparatus of the invention. It has been found that the rotational fan speed of the apparatus, for a relatively small fan appropriate for use in apparatus of the invention, needs to be at least about 4,000 RPM in order to achieve a significant wind speed for causing a suitable "wind chill effect" when the apparatus is secured about the waist of the user. However, it should be appreciated that when the fan propelled misting apparatus is situated closer to the user's face, the minimum rotational fan speed required for suitable results can be reduced, such as to at least about 2,000 RPM. It should also be appreciated by one of ordinary skill in the art that the wind velocity produced by the fan will be dependent upon numerous factors, including the fan blade pitch, the fan motor speed or RPM's, the size of the fan blades, and electrical consumption. As discussed above, it has also been found that the use of a bell shaped fan housing for producing a laminar flow of air from the fan is advantageous in improving the "wind chill effect" experienced by the user.

An object of the invention is therefore to achieve a maximum wind speed production from the fan of the fan propelled misting apparatus with a minimum weight power source, since the apparatus is preferably portable, and worn by the user for convenient, hands-free use. With a 6 volt power supply and fan blades of about 3 inches in diameter, it has been found, for example, that a 30 mph wind speed can be achieved at a point blank range, and a wind speed of approximately 17 mph can be achieved at a distance of 18 to 20 inches away from the fan of the fan propelled misting apparatus, which is approximately a typical distance from the user's belt or waist to the user's face, with the entire apparatus weighing less than 2 pounds. It has been found that when a larger fan blade of about 18 inches in diameter is used, a 30 mph wind speed can be achieved with only about 1,750 RPM; however, a powerful ½ horsepower motor, consuming a significant amount of electricity is required.

Referring to FIGS. 4, 5 and 9, a misting device 143 is also provided, and is currently preferably a spray bottle situated in the pocket 144 of the waist pack, also accessible by a zipper 145, with a water tank 146 that can also be surrounded by and insulated by a packing 147 illustrated in FIG. 9, such as Styrofoam, for example. The spray bottle typically has a neck 148 with an opening and external threads 149 for receiving a correspondingly internally threaded cap 150, having a water intake tube 152 that extends at one end into the water tank, and is connected at the other end to a spray pump 154 in the cap, with a nozzle 156.

It should be readily apparent that in the foregoing embodiments, the misting device could alternatively consist of other water supply sources with an atomizing device for introducing a water vapor mist into the discharge tube, such as a water supply tube with an atomizing nozzle connected to a pressurized water supply hose for continuously providing a water vapor supply, under control of a valve on the water supply tube or the water supply line, for example.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A fan propelled misting apparatus for cooling an extended area by evaporative cooling, comprising:

a blower, having a housing, a hollow, cylindrical mist discharge tube for providing a laminar, high velocity air flow, said hollow, cylindrical mist discharge tube having an unrestricted distal outlet end and a proximal end connected to the housing, and a fan for propelling air flow through said hollow, cylindrical mist discharge tube;

a misting device connected to said blower, the misting device including an atomizing nozzle connected to the hollow, cylindrical mist discharge tube through a port in said hollow, cylindrical mist discharge tube adjacent to the distal outlet end of the hollow, cylindrical mist discharge tube for delivering a fine spray of water to the interior of the outlet end of said hollow, cylindrical mist discharge tube, whereby said fine spray of water mixes in said laminar, high velocity air flow provided in said hollow, cylindrical mist discharge tube, and the misting device including a pressurizable fluid tank with a water supply tube connected between said pressurizable fluid tank and said atomizing nozzle for delivering said fine spray of water to said hollow, cylindrical mist discharge tube.

2. The fan propelled misting apparatus of claim 1, wherein said misting device further comprises a valve for controlling flow of water through said water supply tube.

3. The fan propelled misting apparatus of claim 1, wherein said pressurizable fluid tank comprises a piston type pump having a handle, and a removable cap allowing for filling of said pressurizable fluid tank with water.

4. The fan propelled misting apparatus of claim 1, wherein said fan comprises a propeller, a motor driving said propeller, and a switch controlling operation of said motor.

* * * * *